(12) United States Patent
Lear, Jr.

(10) Patent No.: US 10,731,554 B2
(45) Date of Patent: Aug. 4, 2020

(54) HUMID AIR TURBINE POWER, WATER EXTRACTION, AND REFRIGERATION CYCLE

(71) Applicant: University of Florida Research Foundation, Inc., Gainesville, FL (US)

(72) Inventor: William E. Lear, Jr., Portland, OR (US)

(73) Assignee: University of Florida Research Foundation, Inc., Gainesville, FL (US)

(*) Notice: Subject to any disclaimer, the term of this patent is extended or adjusted under 35 U.S.C. 154(b) by 0 days.

(21) Appl. No.: 16/129,254

(22) Filed: Sep. 12, 2018

(65) Prior Publication Data
US 2019/0078513 A1  Mar. 14, 2019

Related U.S. Application Data

(60) Provisional application No. 62/557,452, filed on Sep. 12, 2017.

(51) Int. Cl.
*F02C 3/34* (2006.01)
*F02B 37/00* (2006.01)
(Continued)

(52) U.S. Cl.
CPC ............... *F02C 3/34* (2013.01); *F02B 37/00* (2013.01); *F02C 3/04* (2013.01); *F02C 3/305* (2013.01);
(Continued)

(58) Field of Classification Search
CPC ...... F02C 3/34; F02C 6/00; F02C 6/18; F02C 3/305; F02C 3/04; F02C 7/141;
(Continued)

(56) References Cited

U.S. PATENT DOCUMENTS 2,482,791 A  9/1949  Nettel et al.
2,646,663 A  7/1953  Sedille
(Continued)

FOREIGN PATENT DOCUMENTS

GB  2351323 A  12/2000
WO  2014164650 A1  10/2014
WO  2015126821 A2  8/2015

OTHER PUBLICATIONS

Khan, et al., "Second Law Analysis of a Novel Combined Cooling and Power Cycle with Water Harvesting," Proceedings of ASME Turbo-Expo, Reno-Tahoe, Nevada, USA, GT2005-68628, Jun. 6-9, 2005.
(Continued)

*Primary Examiner* — Hoang M Nguyen
(74) *Attorney, Agent, or Firm* — Thomas|Horstemeyer, LLP (57) ABSTRACT

Various embodiments relate to combined heat and power (CHP) systems. A CHP system can include a turbine system, a turbocharger system, and a refrigeration system. The refrigeration system can receive combustion products from the turbine system and compressed air from the turbocharger system. The refrigeration system can cool the combustion products and the compressed air to generate a cooled combustion product mixture that is provided to the turbine system. The turbine system can further comprise a fuel cell. This abstract is intended as a scanning tool for purposes of searching in the particular art and is not intended to be limiting of the present disclosure.

19 Claims, 7 Drawing Sheets

(51) Int. Cl.

| | |
|---|---|
| *F02C 7/141* | (2006.01) |
| *H01M 8/04014* | (2016.01) |
| *F02C 3/04* | (2006.01) |
| *F02C 3/30* | (2006.01) |
| *F25B 11/02* | (2006.01) |
| *F02C 6/00* | (2006.01) |
| *H01M 8/04111* | (2016.01) |
| *F02C 6/18* | (2006.01) |
| *F25B 27/02* | (2006.01) |
| *F02C 7/08* | (2006.01) |

(52) U.S. Cl.
CPC ............ *F02C 6/00* (2013.01); *F02C 6/18* (2013.01); *F02C 7/141* (2013.01); *F25B 11/02* (2013.01); *F25B 27/02* (2013.01); *H01M 8/04022* (2013.01); *H01M 8/04111* (2013.01); *F02C 7/08* (2013.01); *H01M 2250/405* (2013.01); *Y02E 20/14* (2013.01); *Y02P 80/15* (2015.11)

(58) Field of Classification Search
CPC ....... F02C 7/08; H01M 8/04022; F02B 37/00; Y02P 80/15; Y02E 20/14; F25B 27/02; F25B 11/02
USPC ........................................ 60/39.181, 39.182
See application file for complete search history.

(56) References Cited

U.S. PATENT DOCUMENTS

| | | | |
|---|---|---|---|
| 2,651,174 | A | 9/1953 | Bolsezian |
| 3,241,327 | A | 3/1966 | Fleur |
| 3,796,045 | A | 3/1974 | Foster-Pegg |
| 4,049,299 | A | 9/1977 | Rigollot |
| 5,121,610 | A | 6/1992 | Atkinson et al. |
| 5,321,944 | A | 6/1994 | Bronicki et al. |
| 5,809,768 | A | 9/1998 | Uematsu et al. |
| 6,082,094 | A | 7/2000 | Longardner et al. |
| 6,263,661 | B1 | 7/2001 | van der Burgt et al. |
| 6,269,624 | B1 | 8/2001 | Frutschi et al. |
| 6,282,883 | B1 | 9/2001 | Uematsu et al. |
| 6,513,318 | B1 | 2/2003 | Wright |
| 6,523,745 | B1 | 2/2003 | Tamori |
| 6,637,183 | B2 | 10/2003 | Viteri et al. |
| 6,651,421 | B2 | 11/2003 | Coleman et al. |
| 6,848,249 | B2 | 2/2005 | Coleman et al. |
| 6,957,539 | B2 | 10/2005 | Lebas et al. |
| 7,472,550 | B2 | 1/2009 | Lear, Jr. et al. |
| 10,211,470 | B2 | 2/2019 | Crisalle et al. |
| 10,247,408 | B2* | 4/2019 | Lear, Jr. ............... F22B 1/1815 |
| 10,480,353 | B2 | 11/2019 | Cook et al. |
| 2002/0152754 | A1 | 10/2002 | MacKay |
| 2003/0000222 | A1 | 1/2003 | Tsuji |
| 2003/0051496 | A1 | 3/2003 | Fukushima et al. |
| 2003/0121268 | A1* | 7/2003 | Erickson ............... F02C 3/305 60/775 |
| 2004/0098965 | A1 | 5/2004 | Dettmer |
| 2004/0103637 | A1* | 6/2004 | Maisotsenko ......... F01K 21/047 60/39.59 |
| 2005/0028529 | A1 | 2/2005 | Bartlett et al. |
| 2008/0187789 | A1* | 8/2008 | Ghezel-Ayagh ....... F02C 1/007 429/414 |
| 2009/0049836 | A1* | 2/2009 | Erickson ............... F02C 7/047 60/728 |
| 2014/0230401 | A1* | 8/2014 | Dunn ..................... F02C 3/34 60/39.52 |
| 2016/0020476 | A1 | 1/2016 | Crisalle et al. |
| 2016/0138431 | A1* | 5/2016 | Lear, Jr. ............... F22B 1/1815 60/775 |
| 2016/0190622 | A1* | 6/2016 | Whyatt ............... H01M 8/0662 429/423 |
| 2017/0009607 | A1 | 1/2017 | Cook et al. |

OTHER PUBLICATIONS

Khan, et al., "Demonstration of a Novel Combined Cooling and Power Gas Turbine with Water Harvesting", 43rd AIAA Aerospace Sciences Meeting and Exhibit, Reno, Nevada, USA, Paper AIAA 2005-571, Jan. 10-13, 2005.

Khan, et al., "Water Extraction and Performance of a Novel Pressurized CHP System", 44th AIAA Aerospace Sciences Meeting and Exhibit, Aerospace Sciences Meetings, https://doi.org/10.2514/6.2006-1499 pp. 1-10.

Khan, et al., "A Novel Combined Absorption Cooling and Gas Turbine Engine with Water Harvesting for Hot and Arid Climates." Proceedings of the Fifth International Conference of the Role of Engineering Towards a Better Environment (RETBE 2004), Alexandria University and Bibliotheca Alexandrina, Alexandria, Egypt, Dec. 11-13, 2004 (14 pages).

Malhotra, et al., "Life Cycle Cost Analysis of a Novel Cooling and Power Gas Turbine Engine," ASME Journal of Energy Resources Technology, JERT-09-1081, vol. 132, No. 4, Dec. 2010, pp. 042401-1 through 042401-9, [DOI: 10.1115/1.4003075].

Khan, et al., Performance of a Novel Combined Cooling and Power Gas Turbine With Water Harvesting. Journal of Engineering for Gas Turbines and Power-transactions of the Asme—J Eng Gas Turb Power-T ASME. 130.10.1115/1.2830854. Jun. 14-17, pp. 1-13, 2004.

Howell et al., Experimental study of a novel gas turbine engine integrated with an absorption refrigeration system, 2007.

\* cited by examiner

HUMID AIR TURBINE POWER, WATER EXTRACTION, AND REFRIGERATION CYCLE

CROSS-REFERENCE TO RELATED APPLICATIONS

This Application claims the benefit of U.S. Provisional Application No. 62/557,452, filed on Sep. 12, 2017, which is incorporated herein by reference in its entirety.

BACKGROUND

Combustion turbines can be used to generate mechanical power and/or electricity. To this end, a combustion turbine can ignite a mixture of fuel and air in order to drive a turbine shaft. A byproduct of the combustion can be the production of heat and water.

SUMMARY

In accordance with the purpose(s) of the disclosure, as embodied and broadly described herein, the disclosure in one aspect, relates to a combined heat and power (CHP) system comprising a turbine system, a turbocharger system and a refrigeration system. In this aspect, the turbine system includes a high pressure compressor, a high pressure turbine, a combustor, and a recuperator, and the turbine system provides a combustion product stream. In this aspect, the turbocharger system comprises a low pressure compressor and a low pressure turbine, and the turbocharger system receives at least a portion of the combustion product stream from the turbine system and provides a compressed air stream. In this aspect, the refrigeration system comprises a hot gas heat exchanger and a cold gas heat exchanger in fluid communication therewith, and the refrigeration system receives at least a portion of the combustion product stream from the turbine system and at least a portion of the compressed air stream from the turbocharger system. According to this aspect, the refrigeration system combines and cools the combustion product stream and the compressed air stream to generate a cooled combustion product mixture that is provided to the turbine system; and the refrigeration system further generates steam that is provided to the turbine system.

Also disclosed is a CHP system including a turbine system, a turbocharger system, and a refrigeration system. In this aspect, the turbine system generates a combustion product, and the turbocharger system generates a compressed air stream. In this aspect, the refrigeration system receives at least a portion of the combustion product and the compressed air stream and cools the combustion products and the compressed air to generate a cooled combustion product mixture that is provided to the turbine system. In this aspect, the refrigeration system further provides water in at least one of liquid or gaseous form to the turbine system.

Also disclosed herein is a method, comprising generating water using a refrigeration system of a CHP system; heating the water using the refrigeration system to generate steam; and providing the steam to a recuperator of a turbine system for the CHP system. In a related aspect, the method optionally further comprises: using a turbocharger system of the CHP system to generate compressed air; providing a mixture of combustion products from the turbine system and compressed air from the turbocharger system to the refrigeration system; cooling the mixture of combustion products and compressed air using the refrigeration system to generate a cooled combustion product mixture; and providing the cooled combustion product mixture to a high pressure compressor of the turbine system. In a related aspect, the method optionally further comprises: using a cold gas heat exchanger of the refrigeration system to generate the water; providing the water to a warm gas heat exchanger that is associated with the refrigeration system and using the warm gas heat exchanger to heat the water; providing the heated water to a gas heat exchanger that is associated with the refrigeration system and using the hot gas heat exchanger to generate the steam. In a related aspect, the method optionally further comprises: pumping the water from the cold gas heat exchanger to the warm gas heat exchanger. In a related aspect, the method optionally further comprises: using the compressor of the turbine system to generate a compressed combustion product mixture; combining the steam and compressed combustion product mixture to generating a humid combustion product mixture; and providing the humid combustion product mixture to a combustor of the turbine system. In a related aspect, the method optionally further comprises: using the compressor of the turbine system to generate a compressed combustion product mixture; combining the steam and compressed combustion product mixture to generating a humid combustion product mixture; and providing the compressed humid combustion product mixture to a fuel cell system that is associated with the turbine system, and using the fuel cell system to generate additional power.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

Additional advantages of the disclosure will be set forth in part in the description which follows, and in part will be obvious from the description, or can be learned by practice of the disclosure. The advantages of the disclosure will be realized and attained by means of the elements and combinations particularly pointed out in the appended claims. It is to be understood that both the foregoing general description and the following detailed description are exemplary and explanatory only and are not restrictive of the disclosure, as claimed.

DETAILED DESCRIPTION

The present disclosure is directed towards power systems that can be used to generate thermal and electrical energy. According to the various embodiments, combined heat and power (CHP) systems, or cogeneration systems, can generate electricity and useful thermal energy in a single, integrated system. While the various embodiments are directed toward systems that can generate thermal and electrical energy, it is not necessary that all of the generated thermal and electrical energy is utilized. For example, in some embodiments, at least a portion of the thermal and/or electrical energy generated by or accessible from the CHP may be wasted or not fully utilized. In some embodiments, the thermal energy generated by the CHP system may be accessible, but wasted or not utilized. In some embodiments, the CHP system also can capture much of the fresh water that is generated in the combustion process that drives the CHP system, as well as capture water from the incoming humid air. According to some embodiments, the fresh water that is generated or captured can be used by the CHP system to enhance system efficiency.

Many modifications and other embodiments disclosed herein will come to mind to one skilled in the art to which the disclosed systems and methods pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. The skilled artisan will recognize many variants and adaptations of the aspects described herein. These variants and adaptations are intended to be included in the teachings of this disclosure and to be encompassed by the claims herein.

Although specific terms are employed herein, they are used in a generic and descriptive sense only and not for purposes of limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure.

Any recited method can be carried out in the order of events recited or in any other order that is logically possible. That is, unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

While aspects of the present disclosure can be described and claimed in a particular statutory class, such as the system statutory class, this is for convenience only and one of skill in the art will understand that each aspect of the present disclosure can be described and claimed in any statutory class.

It is also to be understood that the terminology used herein is for the purpose of describing particular aspects only and is not intended to be limiting. Unless defined otherwise, all technical and scientific terms used herein have the same meaning as commonly understood by one of ordinary skill in the art to which the disclosed compositions and methods belong. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

Prior to describing the various aspects of the present disclosure, the following definitions are provided and should be used unless otherwise indicated. Additional terms may be defined elsewhere in the present disclosure.

As used herein, "comprising" is to be interpreted as specifying the presence of the stated features, integers, steps, or components as referred to, but does not preclude the presence or addition of one or more features, integers, steps, or components, or groups thereof. Moreover, each of the terms "by", "comprising," "comprises", "comprised of," "including," "includes," "included," "involving," "involves," "involved," and "such as" are used in their open, non-limiting sense and may be used interchangeably. Further, the term "comprising" is intended to include examples and aspects encompassed by the terms "consisting essentially of" and "consisting of." Similarly, the term "consisting essentially of" is intended to include examples encompassed by the term "consisting of."

As used in the specification and the appended claims, the singular forms "a," "an" and "the" include plural referents unless the context clearly dictates otherwise.

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

When a range is expressed, a further aspect includes from the one particular value and/or to the other particular value. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, the terms "about," "approximate," "at or about," and "substantially" mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In such cases, it is generally understood, as used herein, that "about" and "at or about" mean the nominal value indicated ±10% variation unless otherwise indicated or inferred. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

As used herein, the terms "optional" or "optionally" means that the subsequently described event or circumstance can or cannot occur, and that the description includes instances where said event or circumstance occurs and instances where it does not.

Figure 1:
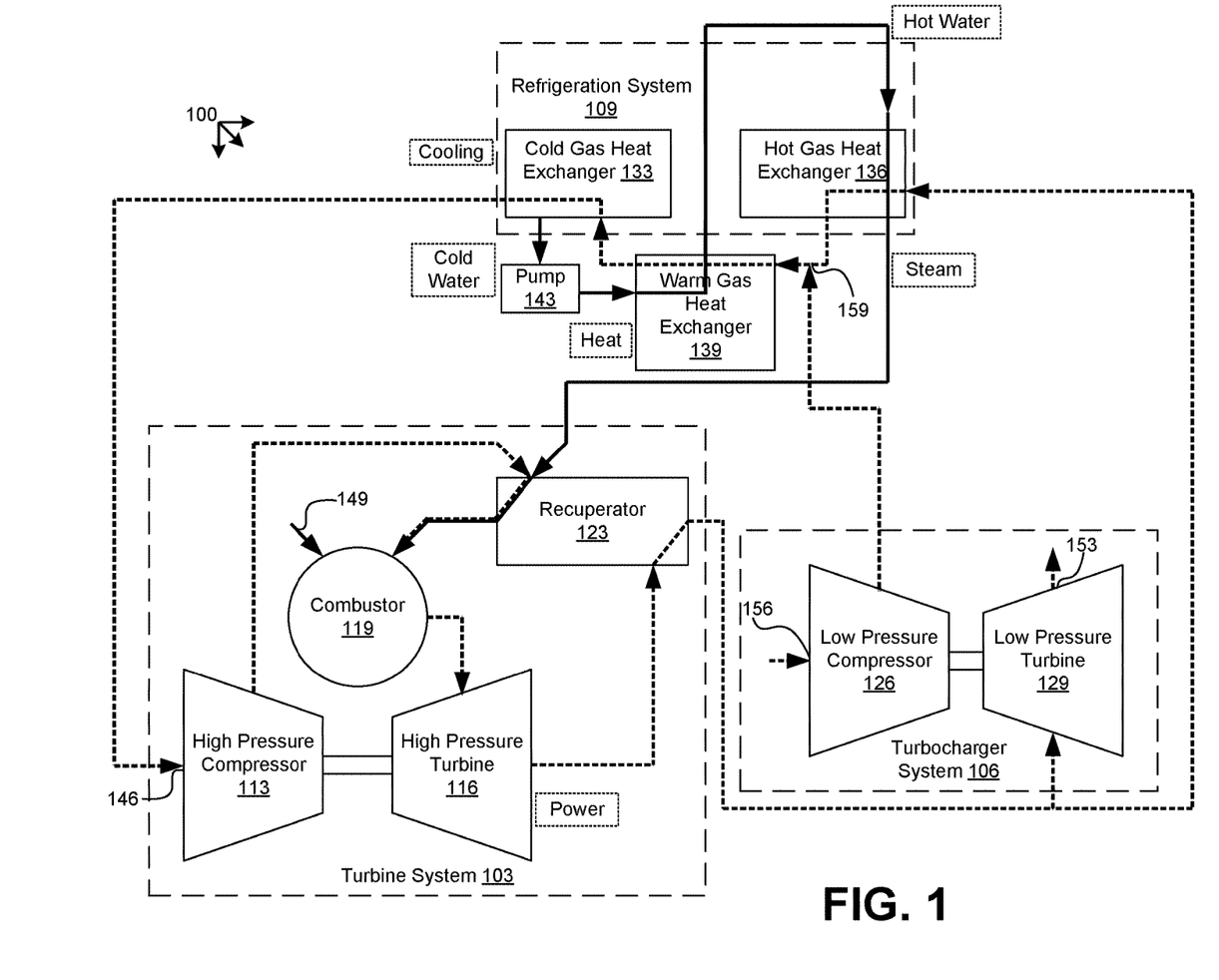
FIG. 1 is a drawing of a combined heat and power (CHP) system according to various embodiments of the present disclosure.

With reference to FIG. 1, a CHP system 100 in accordance with various embodiments of the present disclosure, will be described in more detail. According to various embodiments, the CHP system 100 can be used within in an electric grid network that comprises multiple systems that provide electricity for the electric grid. In alternative embodiments, the CHP system 100 can be a stand-alone system that, for example, provides electricity in emergency situations, for loads that do not have access to an electric grid, for military operations (e.g., forward operating bases), and/or other systems.

Referring to FIG. 1, according to an embodiment the CHP system 100 can include a turbine system 103, a turbocharger system 106, a refrigeration system 109, and/or other systems. The turbine system 103, the turbocharger system 106, and the refrigeration system 109 can be interconnected using piping, conduit, conductors for power and/or data signals, and/or other components.

According to the embodiments, the turbine system 103 can include a high pressure compressor 113, a high pressure turbine 116, a combustor 119, a recuperator 123, and/or other components. The high pressure compressor 113 can be a system configured to receive and compress a mixture of fresh air and recirculated combustion products, as will be described in further detail below. The combustor 119 can be a system that is configured to combust compressed gases to thereby generate a high-temperature flow of combustion gases. The high pressure turbine 116 of the turbine system 103 can be a system in which combustion gases expand and drive a load, such as a generator. As will be described in further detail below, the recuperator 123 can be an energy recovery system that absorbs heat from combustion products.

Referring still to FIG. 1, according to the embodiments, the turbocharger system 106 can comprise a low pressure compressor 126, a low pressure turbine 129, and/or other components. The low pressure turbine 129 of the turbocharger system 106 can receive combustion products from by turbine system 103. In addition, the low pressure turbine 129 can drive the low pressure compressor 126 of the turbocharger system 106.

According to the embodiments, the refrigeration system 109 can be any heat-activated cooling system, such as vapor absorption refrigeration system, or a vapor adsorption refrigeration system, or the like. While several of the embodiments described herein may be described with reference to a vapor absorption refrigeration system, it will be understood that other heat-activated cooling systems can be employed without departing from the scope of the various embodiments. The refrigeration system 109, is described herein with reference to those components which interact with the fluid streams circulating within the CHP system 100 (e.g., the turbine system 103 and the turbocharger system 106). However, it should be understood that the refrigeration system 109 includes one or more additional processes or components (not illustrated) that are associated with the refrigeration cycle. For example, the refrigeration system 109 may include additional systems or processes for circulating and using a refrigerant to accomplish a necessary or desired refrigeration cycle. A non-limiting example of a refrigeration cycle is described in U.S. Pat. No. 7,472,550, which is incorporated herein by reference in its entirety, to the extent it is consistent with the present embodiments. In various embodiments, the refrigeration system 109 may include any additional processes or components associated with the refrigeration cycle that provide features not inconsistent with the description of the embodiments herein.

According to the embodiments, the refrigeration system 109 can comprise a cold gas heat exchanger 133, a hot gas heat exchanger 136, and/or other components. Additionally, a warm gas heat exchanger 139 and a pump 143 may be associated with the refrigeration system 109.

According to the embodiments, the hot gas heat exchanger 136 of the refrigeration system 109 can receive and absorb and/or transfer heat from combustion products provided by the turbine system 103. The warm gas heat exchanger 139 associated with the refrigeration system 109 can receive and absorb and/or transfer heat from combustion gases provided by the turbocharger system 106 and the hot gas heat exchanger 136. The warm gas heat exchanger 139 can be an intercooler, meaning that it can extract heat from the combustion gases and transfer the heat to an ambient fluid, such as air. In an embodiment, at least a portion of the extracted heat can be used to heat water, such as the water collected from cold gas heat exchanger 133. In various embodiments, at least a portion of the extracted heat can provide a heat load used within the CHP system 100 or externally. The cold gas heat exchanger 133 of the refrigeration system 109 can receive and absorb heat from a mixture of air and combustion products provided by the warm gas heat exchanger 139. In addition, the cold gas heat exchanger 133 can be used to generate cold water, was will be described in further detail below. The pump 143 can be used to pump the generated water to various destinations.

According to the embodiments, the turbine system 103, the turbocharge system 106, and the refrigerator system 109 of the CHP system 100 are fluidically interconnected, e.g., such that the stream generated by one system is received by one or more of the other systems. Referring to FIG. 1, in one embodiment, the pathways for fresh air, combustion products, and water through the CHP system 100 are illustrated. In particular, the pathways for fresh air and combustion products are shown using dashed lines, and the pathway for water (in liquid and/or gaseous form) are shown using solid lines. Various aspects of the embodiments are described below.

According to some embodiments, beginning with inlet 146, an inlet stream comprising a mixture of fresh air, steam, and recirculated combustion products is provided to the high pressure compressor 113 of the turbine system 103. Further description regarding this mixture of fresh air and recirculated combustion products is provided below. The high pressure compressor 113 compresses the mixture of fresh air, steam, and recirculated combustion products, and the resultant compressed gases are provided to the cold side of the recuperator 123.

Referring still to FIG. 1, according to the embodiments, the recuperator 123 heats the compressed gases along with vapor from the refrigerator system 109, and provides the compressed gases, along with vapor, to the combustor 119. At the combustor 119, fuel 149 is combusted using the compressed gases and vapor to generate a stream comprising high-temperature combustion gases. The fuel 149 can include any combustible fuel, such as a hydrocarbon fuel. For most hydrocarbon fuels, the resulting combustion gases will comprise carbon dioxide and water (in the form of water vapor) along with lesser amounts of other gaseous products. These high-temperature combustion gases are provided to the high pressure turbine 116, where the combustion gases expand, driving a generator and/or any other type of mechanical load. In this way, the turbine system 103 may produce mechanical power and/or electricity for one or more loads.

According to the embodiments, the combustion products resulting from the high pressure turbine 116 are provided to the hot side of the recuperator 123, which absorbs heat from the combustion products (and exchanges the heat with the cold side of the recuperator 123). The resulting combustion product stream is then provided as an input stream to the turbocharger system 106 and the refrigeration system 109. For example, the combustion product stream from the recuperator 123 may be divided into a first portion that is received as an input stream to the turbocharger system 106 and a second portion that is received as an input stream to the refrigeration system 109. The proportion of the first and second portions of the combustion product stream can be controlled and modified to produce any necessary or desired result.

According to the embodiments, a first portion of the combustion products from the turbine system 103 is provided as an input stream to the low pressure turbine 129 of the turbocharger system 106. The combustion products provided to the low pressure turbine 129 drive the low pressure compressor 126. Additionally, exhaust is emitted from the low pressure turbine 129 at outlet 153. By way of example, the exhaust at outlet 153 may be vented to the atmosphere, or recycled, or treated further.

In some embodiments, fresh air is provided at inlet 156 to the low pressure compressor 126 of the turbocharger system 106. In some embodiments, the fresh air may be filtered. In some embodiments, the inlet 156 may be sound damped. The low pressure compressor 126 then compresses the fresh air to provide an outlet stream comprising the compressed fresh air. In some embodiments, the fresh air is compressed by a factor of five. As a non-limiting example, if the atmospheric pressure is 1.0 atm, the low pressure compressor 126 compresses the fresh air to a pressure of 5.0 atm. The low pressure compressor 126 may compress the fresh air at other factors in other embodiments. According to the various embodiments, the compressed fresh air can be provided as an input to the refrigeration system 109. In some embodiments, the compressed fresh air can be combined with one or more combustion products at mixing point 159. The compressed fresh air can also be mixed with the recirculator products between the warm gas heat exchanger 139 and the cold gas heat exchanger 133.

According to the embodiments, a second portion of the combustion products from the turbine system 103 is provided to the refrigeration system 109. In particular embodiments, this second portion of the combustion products is provided to the hot gas heat exchanger 136, which absorbs heat from the combustion products, providing an output stream of cooled combustion products. The heat from combustion products provided to the hot gas heat exchanger also drives the refrigeration system 109.

The cooled combustion products exiting hot gas heat exchanger 136 may then be combined at mixing point 159 with compressed fresh air provided by the low pressure compressor 126 of the turbocharger system 106. In some embodiments the cooled combustion products and compressed fresh air are mixed at a 3-to-1 ratio of combustion products to fresh air. The cooled combustion products and compressed fresh air may be mixed at other ratios and/or at other points in the flow path in other embodiments.

Referring still to FIG. 1, according to the embodiments, the mixture of cooled combustion products and compressed fresh air is then provided to the warm gas heat exchanger 139. The warm gas heat exchanger 139 absorbs heat from the mixture of combustion products and fresh air, providing a cooled mixture of combustion products and fresh air. This absorbed heat may be provided to external systems. Additionally, this heat can be used to heat water within the CHP system 100, as will be described in further detail below. Additionally, heat absorbed by the refrigeration system 109 can also be used to heat water.

According to the embodiments, the cooled mixture of combustion products and fresh air resulting from the warm gas heat exchanger 139 is provided as an input to the cold gas heat exchanger 133. The cold gas heat exchanger 133 absorbs heat from the mixture of combustion products and fresh air, providing a chilled mixture of combustion products and fresh air. In some embodiments, the refrigeration system 109 may comprise an additional heat exchanger (not shown) for which refrigerant associated with the cold gas heat exchanger may be used to cool an external load.

According to the embodiments, the chilled mixture of combustion products and fresh air from the cold gas heat exchanger 133 of the refrigeration system 109 is then provided to the inlet 146 of the high pressure compressor 113, as described above. According to the embodiments, the chilled mixture of combustion products and fresh air may result in an improved cycle thermodynamic efficiency relative to other systems that do not provide a chilled mixture of combustion products and fresh air. In some embodiments, the chilled mixture may comprise a ratio of combustion products to fresh air that is about 1:1 to about 4:1, or about 3:1. In some embodiments, the fuel-air equivalence ratio ($\varphi$), which is a ratio of the fuel-to-oxidizer ratio for the system to a stoichiometric fuel-to-oxidizer ratio, is about 0.7 to about 0.95, or about 0.9. In some embodiments, the chilled mixture may comprise a ratio of combustion products to fresh air that provides a necessary or desired fuel-air equivalence ratio.

In some embodiments, the temperature of the chilled mixture may be between about −15° C. and about 15° C. In some embodiments, the temperature of the chilled mixture is less than about 15° C., or less than about 10° C., or less than about 5° C. In some embodiments, the temperature of the chilled mixture may be approximately 3° C. In some embodiments in which the temperature of the chilled mixture is sub-freezing, a heat exchanger may be used to avoid ice formation, for example, a direct heat exchange process using a glycol loop.

In some embodiments, the pressure of the chilled mixture may be greater than about 2 atm, or greater than about 3 atm or greater than about 4 atm, In some embodiments, the pressure of the chilled mixture may be from about 2 atm to about 6 atm, or from about 3 atm to about 5 atm. In some embodiments, the pressure of the chilled mixture may be approximately 3 atm. In some embodiments, the pressure of the chilled mixture may be dependent, at least in part, upon the equipment specifications of the turbocharger system 106. Generally speaking, a more efficient turbocharge system 106 can provide a higher delivered pressure. According to the embodiments, the turbocharger system 106 or the components thereof can be selected to provide any necessary or desired result. The chilled mixture of combustion products and fresh air may have other characteristics in other embodiments.

According to the various embodiments, when the cold gas heat exchanger 133 operates to, for example, chill the mixture of combustion products and fresh air, fresh water may condense on or near the cold gas heat exchanger 133. This condensed fresh water may be collected and provided to external systems. In other embodiments, the condensed fresh water produced by cold gas heat exchanger 133 may be provided to one or more other systems within the CHP 100. In some embodiments, the fresh water may be provided to the pump 143, which may increase the water pressure.

In some embodiments, make-up water may optionally be added to the CHP system 100, such as, for example, to compensate for water losses elsewhere in the system. In some embodiments, the make-up water may be introduced to the system at the refrigeration system 109. For example, the make-up water may be combined with the condensed fresh water produced by the cold gas heat exchanger 133.

In some embodiments, the fresh water produced by cold gas heat exchanger 133 may then be provided as an input to the warm gas heat exchanger 139 and/or the refrigeration system 109. Heat from the warm gas heat exchanger 139 can increase the temperature of this fresh water. This heated water may be provided to external systems. In some embodiments, the heated water is provided from the warm gas heat exchanger 139 to the hot gas heat exchanger 136, which further increases the temperature of the fresh water, generating steam. In some embodiments, the steam generated by the hot gas heat exchanger 136 may be provided to external systems. In some embodiments, the steam generated by the hot gas heat exchanger 136 may be provided to one or more systems within the CHP 100. For example, referring to FIG. 1, in some embodiments, the steam from the hot gas heat exchanger 136 of the refrigeration system 109 is provided to the recuperator 123 of the turbine system 103.

In alternative embodiments, hot gas heat exchanger 136, generates a hot water stream (in liquid form) rather than steam. In these embodiments, instead of the refrigeration system 109 providing steam to the recuperator 123, the refrigeration system 109 can provide hot water in liquid form to the recuperator 123. In some embodiments, the hot water in its liquid form can be evaporated, such as in a saturator that causes the liquid water to evaporate, and the resulting steam can be mixed with the compressed gases from the high pressure compressor 113.

According to the embodiments, at the recuperator 123, the steam (either from the hot gas heat exchanger 136, or from a saturator) is combined with the mixture of combustion products and fresh air from the high pressure compressor 113 of the turbine system 103 to provide a humid mixture of combustion products and fresh air. This humid mixture is then heated in the recuperator 123, and the heated mixture is provided as an input to the combustor 119, where the heated mixture and fuel 149 are combusted, producing a humid mixture of combustion products. Use of a humid mixture of combustion products at the combustor 119 may result in combustion that is more efficient relative to systems that do not provide a humid mixture of combustion products for combustion.

According to the various embodiments described herein, the CHP system 100 may provide several benefits relative to conventional systems. For example, the CHP system 100 described herein may have a higher "on" design efficiency as compared to conventional turbine systems due at least in part to the relatively low temperature of the input stream entering the turbine system 103. In addition, the CHP system 100 may have a higher "off" design efficiency relative to conventional turbine systems due at least in part to the ability to maintain the turbine system 103 at a relatively fixed set of temperature states. Additionally, the CHP system 100 may be more reliable, quieter, have a lower cost of materials, have a faster time response, and have lower emissions levels relative to conventional systems.

Figure 2A:
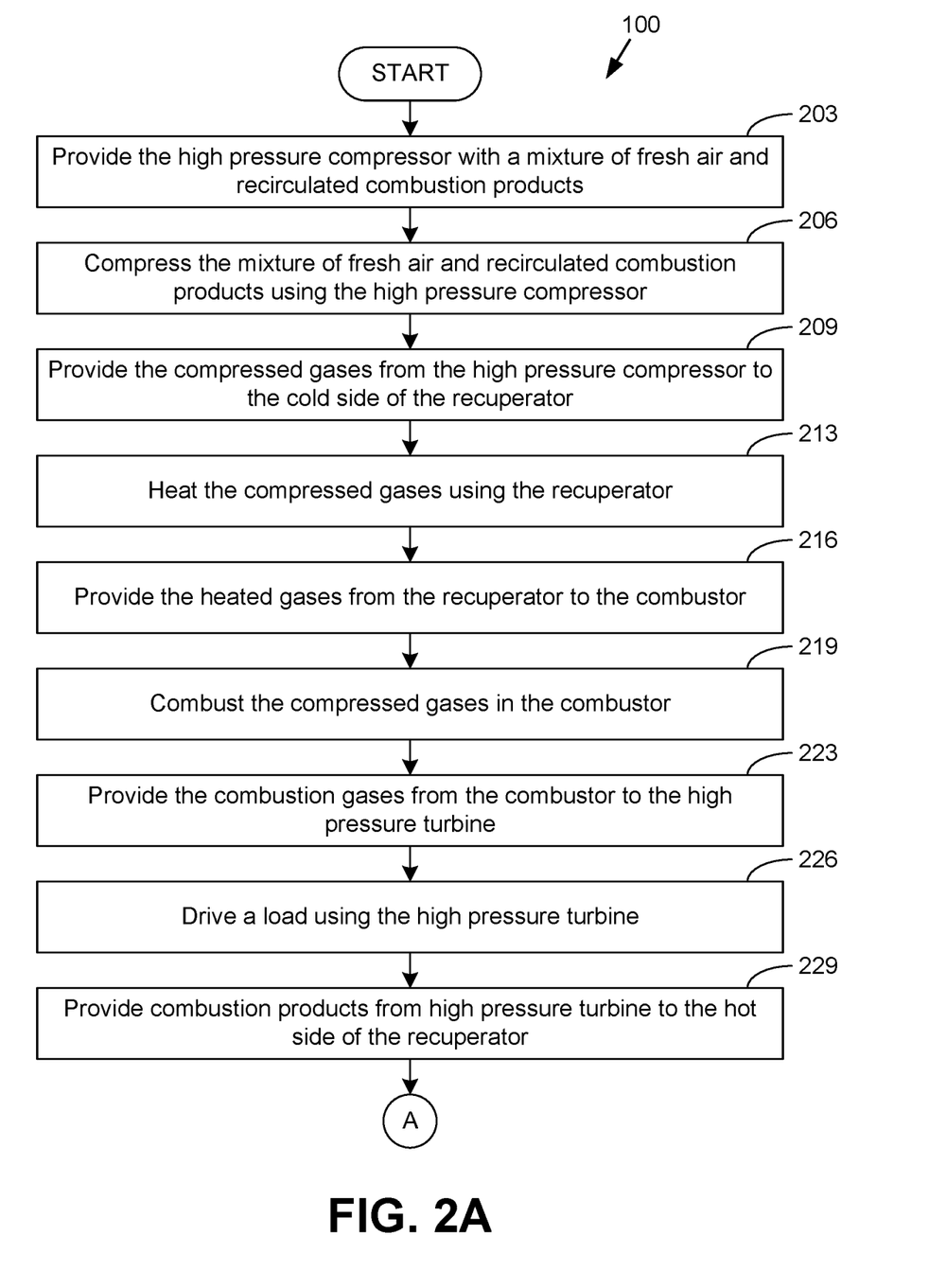
FIGS. 2A-2C are a flowchart illustrating an example of the operation of the CHP system of FIG. 1 according to various embodiments of the present disclosure.
Figure 2B:
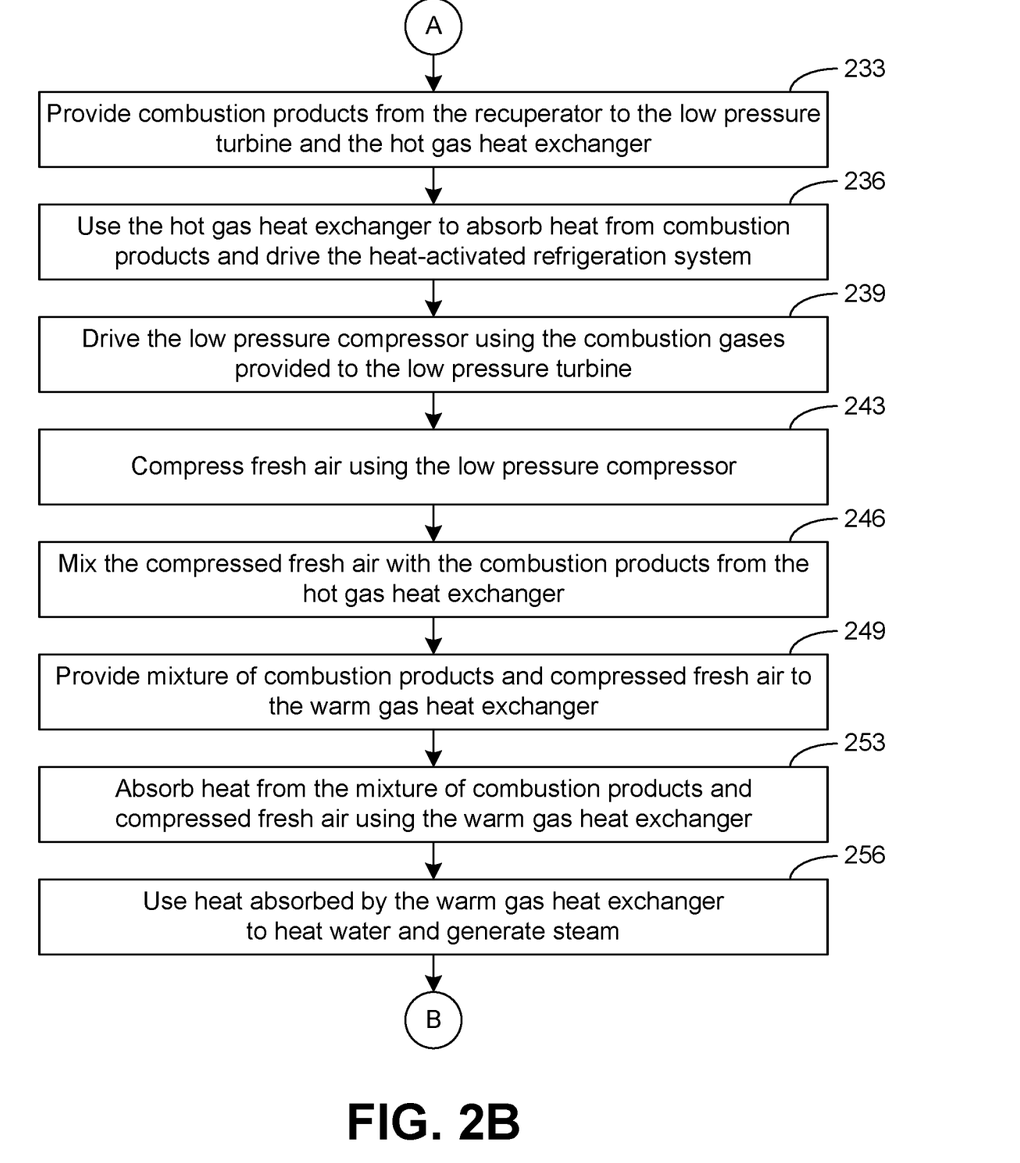
Figure 2C:
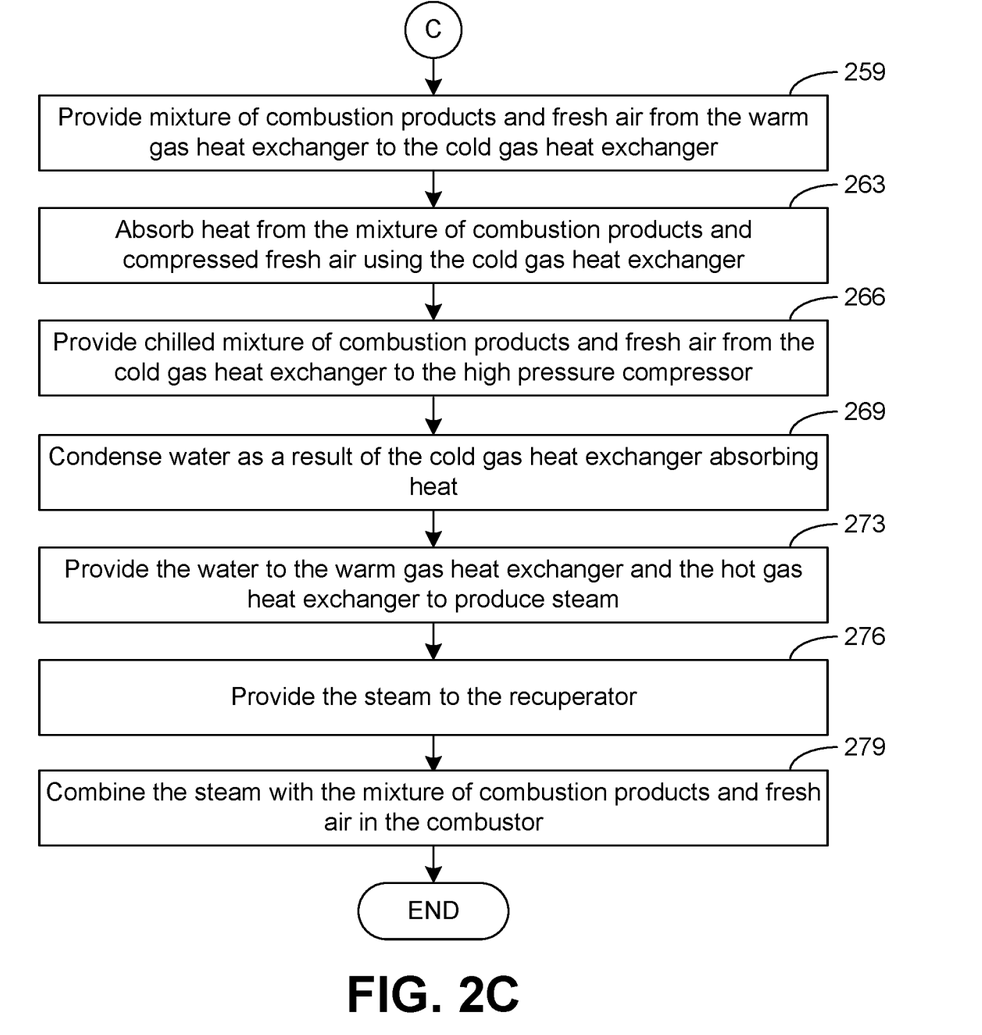

With reference to FIGS. 2A-2C, the operation of the CHP system 100 of the various embodiments, is further illustrated with a flowchart. It is understood that the flowcharts of FIGS. 2A-2C provide merely one example, among others, of the operation of the CHP system 100. Although the flowchart of FIGS. 2A-2C illustrate a specific order of operation, the order of execution may differ from that which is depicted. For example, in some embodiments the order of performance of two or more boxes may be switched relative to the order shown, without departing from the scope of the embodiments. In some embodiments, two or more boxes shown in succession in FIGS. 2A-2C can be performed concurrently or with at least partial concurrence. Further, in some embodiments, one or more of the boxes shown in FIGS. 2A-2C can be skipped or omitted.

Referring to FIGS. 1 and 2A, beginning with box 203, the high pressure compressor 113 is provided with a mixture of fresh air and recirculated combustion products. At box 206, the mixture of fresh air and recirculated combustion products is compressed using the high pressure compressor 113. The compressed gases are then provided from the high pressure compressor 113 to the cold side of the recuperator 123, as shown at box 209.

At box 213 the recuperator 123 heats the received compressed gases. The heated gases are then provided from the recuperator 123 to the combustor 119, as shown at box 213. As indicated at box 216, the heated gases are then provided from the recuperator 123 to the combustor 119, and the combustor 119 then combusts the compressed gases, as shown at box 219. At box 223, the combustion gases from the combustor 119 are then provided to the high pressure turbine 116.

At box 226, the high pressure turbine 116 drives a load, such as a generator, as a result of the combustion gases expanding in the high pressure turbine 116. The combustion products are also provided from the high pressure turbine 116 to the hot side of the recuperator 123, as indicated at box 229.

Referring to FIGS. 1 and 2B, at box 233, combustion products are provided from the hot side of the recuperator 123 to the low pressure turbine 129 of the turbocharger system 106 and also to the hot gas heat exchanger 136 of the refrigeration system 109. As indicated at box 236, the hot gas heat exchanger 136 absorbs heat from the provided combustion products and drives the refrigeration system 109. At box 239, the low pressure turbine 129 uses the provided combustion gases to drive the low pressure compressor 126, and the low pressure compressor 126 compresses fresh air, as shown at box 243. The compressed fresh air is then mixed with the combustion products from the hot gas heat exchanger 136, as indicated at box 246.

As shown at box 249, the mixture of the combustion products and compressed fresh air is provided to the warm gas heat exchanger 139. The warm gas heat exchanger 139 then absorbs heat from the received mixture of combustion products and compressed air, as shown at box 253, and the absorbed heat is used by the warm gas heat exchanger 139 to heat water to thereby generate steam, as shown at box 256.

Referring to FIGS. 1 and 2C, at box 259, the mixture of combustion products and fresh air are provided from the warm gas heat exchanger 139 to the cold gas heat exchanger 133, where the cold gas heat exchanger 133 absorbs heat from the received mixture, as indicated at box 263. Then, as shown at box 266, the chilled mixture of combustion products and fresh are is provided from the cold gas heat exchanger 133 to the high pressure compressor 113. As a result of the cold gas heat exchanger 133 absorbing heat, water condenses on or near the cold gas heat exchanger 133, as shown at box 269.

As indicated at box 273, the condensed water is provided to the warm gas heat exchanger 139 and the hot gas heat exchanger 136 to produce steam. At box 276, the steam is provided to the recuperator 123. The steam is then combined with the mixture of combustion products and fresh air in the combustor 119, as shown at box 279. Thereafter, the process ends.

Figure 3:
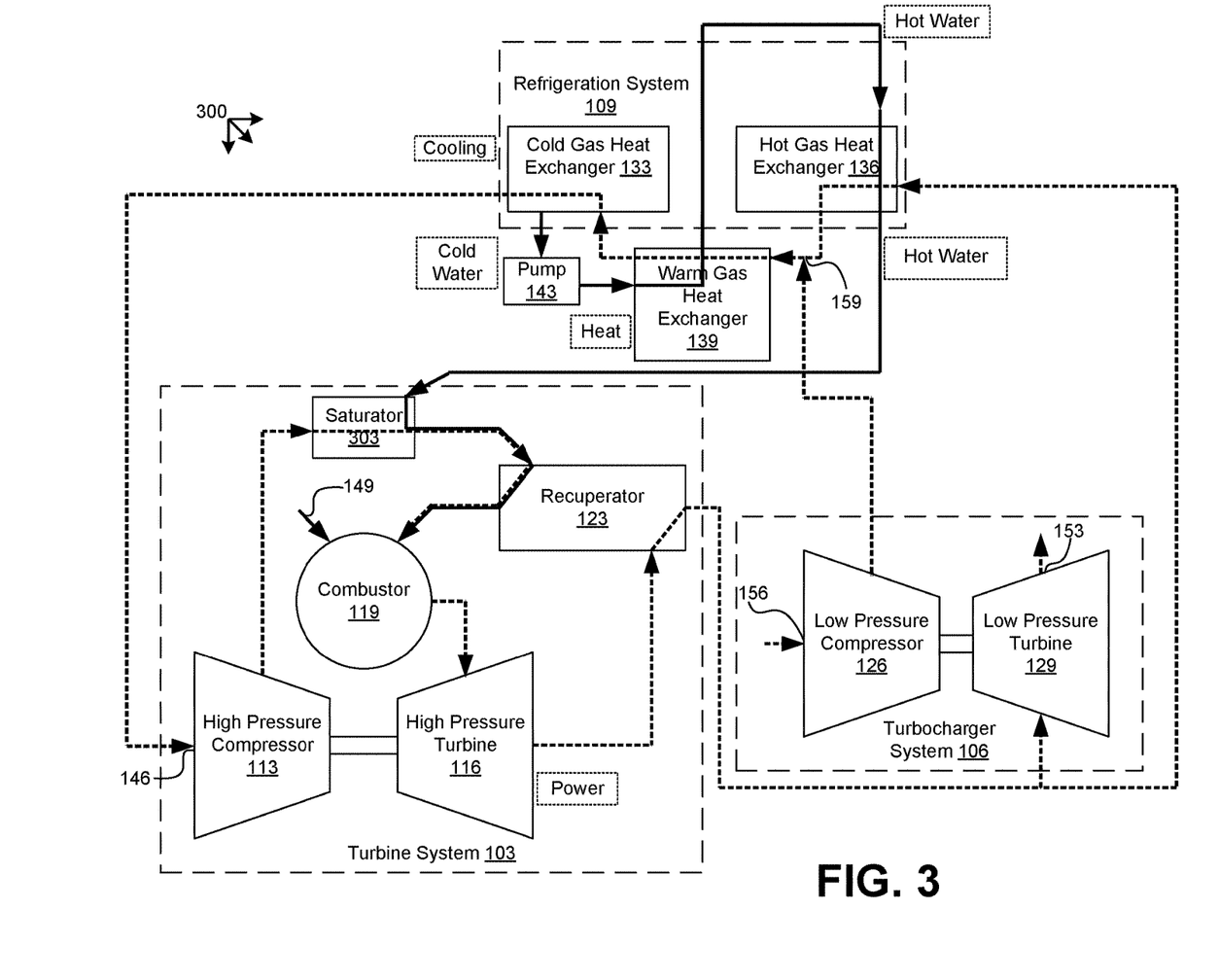
FIG. 3 is a drawing of another CHP system according to various embodiments of the present disclosure.

Referring now to FIG. 3, in another embodiment of the disclosure, a CHP system 300 is similar to the CHP system 100 shown in FIG. 1. However, for the CHP system 300, the turbine system 103 also includes a saturator 303 in fluid communication with the high pressure compressor 113, the hot gas heat exchanger 136, and the recuperator 123. In this embodiment, the hot gas heat exchanger 136 of the refrigeration system 109 produces hot water rather than steam. Referring to FIG. 3, the hot water is provided as an input to the saturator 303. The saturator 303 can cause the received hot water to evaporate. The resultant steam can be mixed with the compressed gases from the high pressure compressor 113. The mixture of evaporated water and compressed gases is then provided to the recuperator 123.

Figure 4:
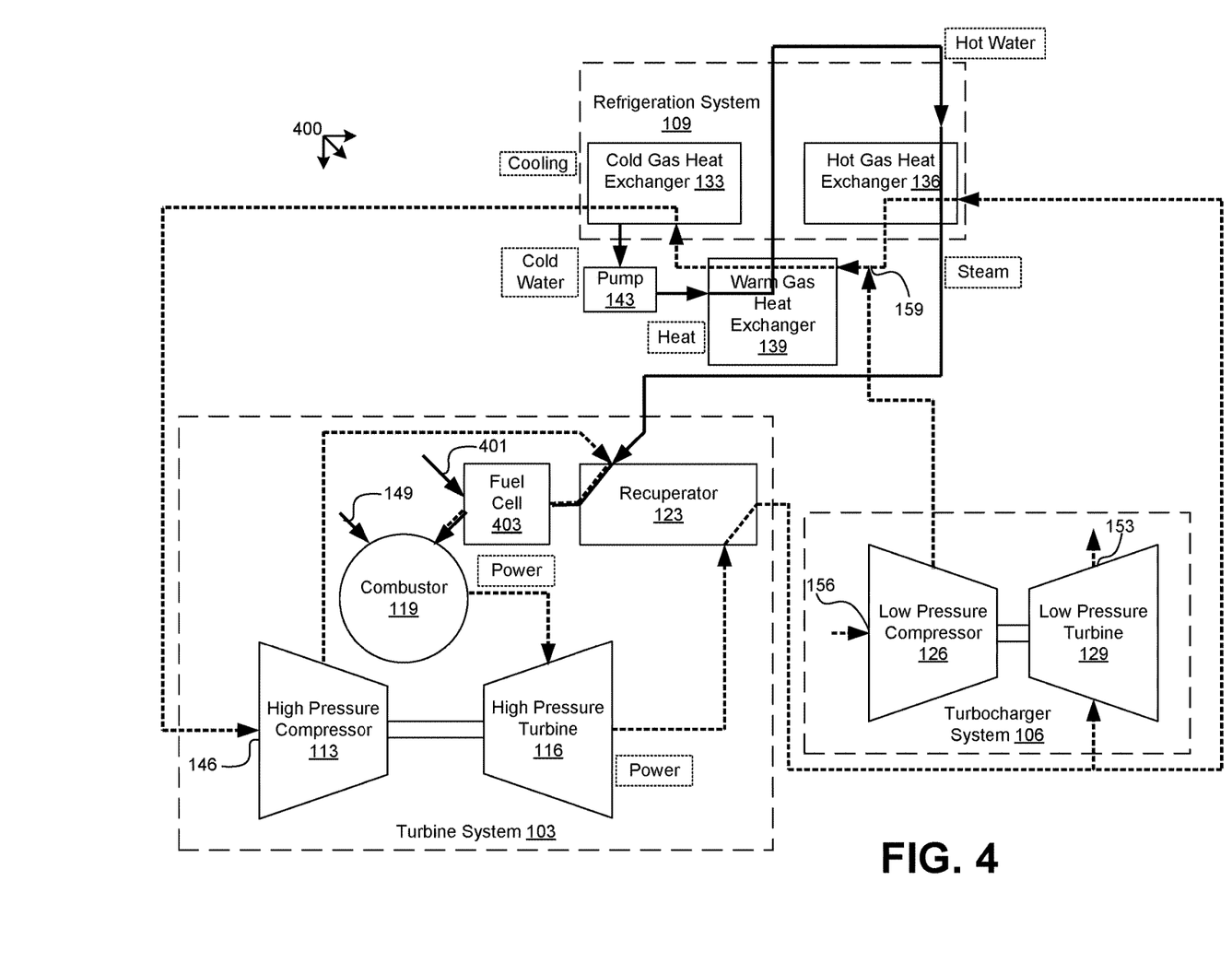
FIG. 4 is a drawing of another CHP system according to various embodiments of the present disclosure.

Referring now to FIG. 4, in yet another embodiment, the turbine system 103 of CHP system 400 also integrates a fuel cell 403 before the combustor 119. According to this embodiment, the inputs to the fuel cell 403 include compressed gas from one of the CHP systems, e.g., compressed gas from the recuperator 123, and compressed fuel 401 (e.g., natural gas or nearly any syngas compatible with the fuel cell 403). The outputs of the fuel cell 403 include electric power and hot depleted oxidizer and fuel streams.

In some embodiments, the fuel cell 403 includes a cooling circuit (not shown). In these embodiments, steam or hot water from the hot gas heat exchanger 136 can be provided as a coolant to the cooling circuit of the fuel cell 403. In an embodiment, the coolant is hot water, and the hot water can evaporate while cooling the fuel cell 403, and the steam can then be mixed with the compressed gases and fed to the recuperator 123. In an embodiment, the coolant is steam, and the steam is superheated while cooling the fuel cell 403, and the superheated steam can then be mixed with the compressed gases and fed to the recuperator 123.

In various aspects, the fuel cell 403 can be a fuel cell capable of operating at a high temperature ("high-temperature fuel cell"). Exemplary, but non-limiting examples of such a fuel cell include a solid oxide fuel cell (also referred to as a SOFC), a molten carbonate fuel cell (also referred to as a MCFC), a high-temperature proton exchange membrane fuel cell (also referred to as a HT-PEMFC), a tubular solid oxide fuel cell (also referred to as a TSOFC), a protonic ceramic fuel cell, a direct carbon fuel cell, a phosphoric-acid fuel cell (also referred to as a PAFC), or a planar solid oxide fuel cell. The disclosed CHP system 400 comprising a fuel cell 403 also contemplates integration of other high operating temperature fuel cells that becoming available in the future. It is to be understood that "high operating temperature" refers to a working temperature of the fuel cell of at least about 100° C., at least about 110° C., at least about 120° C., at least about 130° C., at least about 140° C., at least about 150° C., at least about 160° C., at least about 170° C., at least about 180° C., at least about 190° C., at least about 200° C., at least about 250° C., at least about 300° C., at least about 350° C., at least about 400° C., at least about 450° C., at least about 500° C., at least about 550° C., at least about 600° C., at least about 650° C., at least about 700° C., or any range of temperatures comprising any of the foregoing values or any combination of the foregoing values. In a further aspect, the fuel cell 403 operates in a temperature range compatible with the operation of the high pressure turbine 116.

Before proceeding to the Examples, it is to be understood that this disclosure is not limited to particular aspects described, and as such may, of course, vary. Other systems, methods, features, and advantages of foam compositions and components thereof will be or become apparent to one with skill in the art upon examination of the following drawings and detailed description. It is intended that all such additional systems, methods, features, and advantages be included within this description, be within the scope of the present disclosure, and be protected by the accompanying claims. It is also to be understood that the terminology used herein is for the purpose of describing particular aspects only, and is not intended to be limiting. The skilled artisan will recognize many variants and adaptations of the aspects described herein. These variants and adaptations are intended to be included in the teachings of this disclosure and to be encompassed by the claims herein.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the disclosure and are not intended to limit the scope of what the inventors regard as their disclosure. Efforts have been made to ensure accuracy with respect to numbers (e.g., amounts, temperature, etc.), but some errors and deviations should be accounted for. Unless indicated otherwise, parts are parts by weight, temperature is in Kelvin or is at ambient temperature, and pressure is at or near atmospheric.

Example 1: Design-Point Efficiency Calculation

Figure 5:
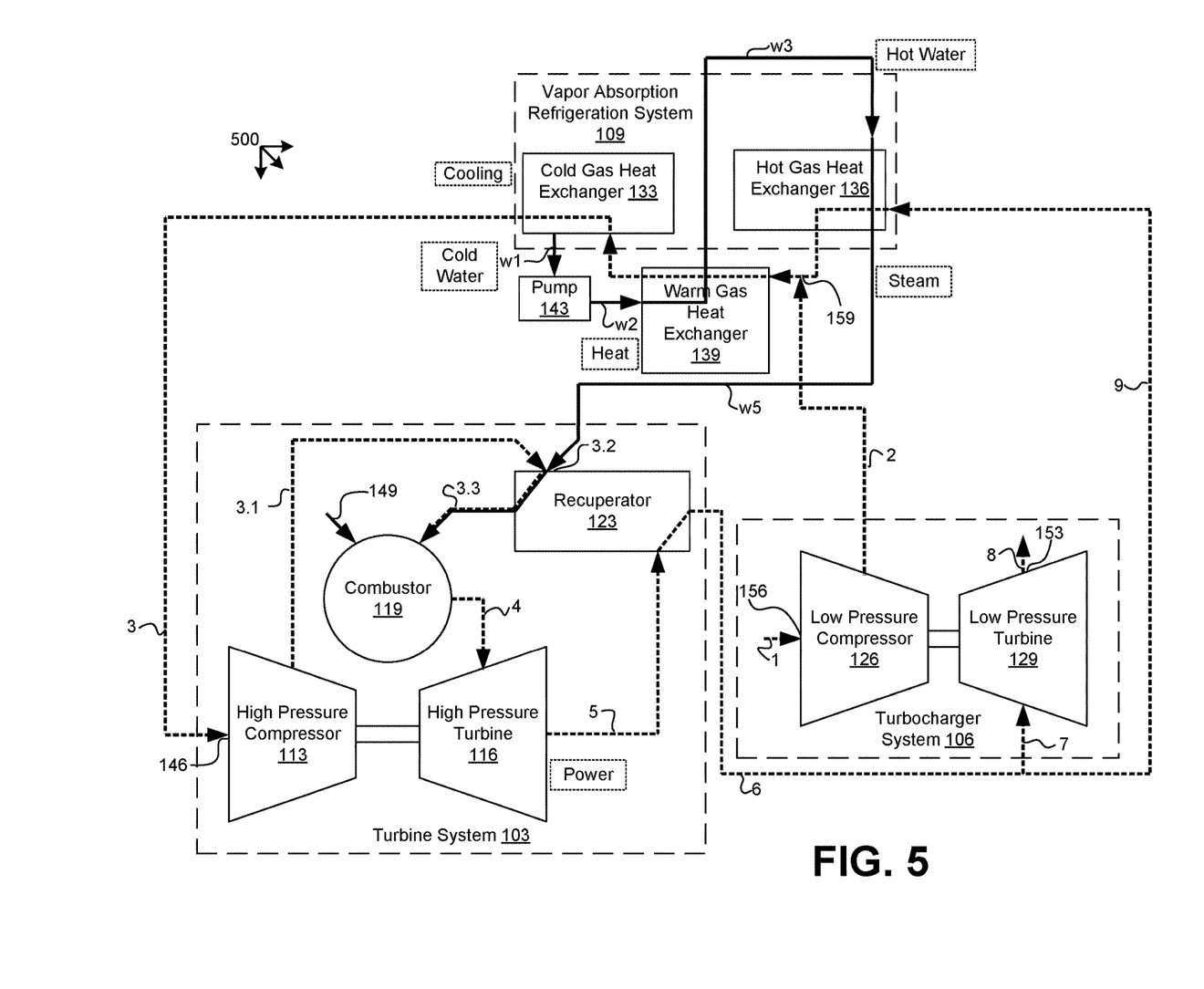
FIG. 5 is a drawing of another CHP system according to various embodiments of the present disclosure.

In this example, the calculation of the design-point efficiency of an exemplary CHP, will be described with reference to FIG. 5, in which CHP system 500 includes a turbine system 103, a vapor absorption refrigeration system 109, and a turbocharger system 106, consistent with the embodiments described herein. Referring to FIG. 5, various State points for the various streams throughout the CHP system 500 are designated with reference numbers 1 through 9, and w1 through w5. These State points are specifically referenced in the calculation.

The design of the plant typically involves a high-level optimization, trading off component size, materials, and cost against the overall objective, which is often life cycle costs constrained by limits on emissions, plant footprint, noise, etc. For this example, turbomachinery efficiencies have been chosen typical of gas turbines of a few megawatts, combined heat exchanger/piping losses and effectivenesses appropriate for systems optimized without significant size constraints, and the fuel mass flow is neglected in comparison to the combustor inlet flow. Table 1 shows the input parameter values used in this example.

TABLE 1

Input parameters for example design-point case.

| Parameter | |
|---|---|
| Turbine inlet temperature | 1700 K |
| Recuperator max inlet T | 1250 K |
| Compressor poly efficiency | 90% |
| Turbine poly efficiency | 92% |
| Relative pressure drop: | |
| Combustor | 2.5% |
| Recuperator hot side | 3% |
| Recuperator cold side | 2% |
| Recirculation coolers | 1% each (x3) |
| HX Effectiveness: | |
| Recuperator | 92% |
| Recirculation cooler WGC | 90% |

Referring to FIG. 5, for this example, the steam flow at State w5 (between hot gas heat exchanger 136 and the recuperator 123) is taken to be 20% of the total flow at State 3.2 (within the recuperator 123). This is a reasonable ratio for wet cycles and could be higher, limited only by the capacity of the vapor absorption refrigeration system 109 to provide sufficient cooling capacity to condense the water at State w1 and cool the gas flow at State 3 to the target temperature of 3° C.

The turbine system 103 is the only part of the cycle of CHP 500 in which net power is produced, so by using the assumption of thermally perfect gas, to find the cycle efficiency, it is only necessary to determine the temperatures in that block 103. For this estimate, the specific heat ratio is approximated based on local temperature and composition, with values of 1.35 (States 3, 3.1), 1.33 (States 3.2, 3.3), and 1.3 (States 4, 5, 6, 9).

As shown in Table 1, the high pressure turbine 116 (HPT) inlet and outlet temperatures are each specified, based on material limits in the turbine 116 and recuperator 123. With these known, the HPT pressure ratio can be calculated and, using the design relative pressure drops in the heat exchangers and combustor 119, the HPC pressure ratio can be calculated. This allows a straightforward calculation of the required temperatures.

a) High Pressure Turbine Pressure Ratio

From the definition of turbine polytropic efficiency, the turbine pressure ratio can be calculated from the following Equation (I):

$$\frac{p_4}{p_5} = \left(\frac{T_4}{T_5}\right)^{\frac{\gamma}{(\gamma-1)\eta_{pT}}} \quad \text{Equation (I)}$$

Substituting the specified values of temperatures, efficiency, and specific heat ratio for CHP 500 yields a turbine pressure ratio of 4.26.

b) High Pressure Compressor Pressure Ratio

The HPC pressure ratio is found by forming an identity:

$$\frac{p_{3.1}}{p_3} = \frac{p_{3.1}}{p_{3.2}} \frac{p_{3.2}}{p_{3.3}} \frac{p_{3.3}}{p_4} \frac{p_4}{p_5} \frac{p_5}{p_6} \frac{p_6}{p_9} \frac{p_9}{p_{10}} \frac{p_{10}}{p_{11}} \frac{p_{11}}{p_{12}} \frac{p_{12}}{p_3} \quad \text{Equation (II)}$$

Each ratio on the right side of Equation (II) is known from the relative pressure drop, except the previously-calculated HPT pressure ratio. Substituting input values, the HPC pressure ratio is 4.73.

c) Recuperator Cold-Side Inlet Temperature

The temperatures at States 6 and 9 are equal, ignoring the small heat loss in the duct. The steam temperature at State w5 ($T_{w5}$) approaches that of State 9; temperature at State 3.2 ($T_{3.2}$) approaches that of State 6. Therefore, $T_{w5}$ is very close to $T_{3.2}$. That implies that both must equal the temperature at State 3.1 ($T_{3.1}$).

d) High Pressure Compressor Exit Temperature.

From the definition of compressor polytropic efficiency, the following Equation (III) can be utilized:

$$\frac{T_{3.1}}{T_3} = \left(\frac{p_{3.1}}{p_3}\right)^{\frac{\gamma-1}{\gamma\eta_{pc}}} \quad \text{Equation (III)}$$

Taking $T_3$ as 276 K, one obtains $T_{3.1}$=432 K. As discussed above, $T_{3.1}$ is also the approximate value of $T_{3.2}$.

e) Recuperator Exit Temperatures

With the temperature values at States 3.2 and 5 being 432 K and 1250 K, respectively, and the recuperator effectiveness taken as 0.92, the recuperator exit states may now be calculated. Assuming the cold stream to have the minimum heat capacity, the following Equation (IV) can be utilized:

$$T_{3.3}=T_{3.2}+\varepsilon_R(T_5-T_{3.2}) \qquad \text{Equation (IV)}$$

Inserting values yields $T_{3.3}=1185$ K. Similarly, an energy balance yields $T_6=497$ K.

f) Cycle Efficiency

The cycle efficiency may now be calculated from the known state temperatures, using Equation (V):

$$\eta_{th} = \frac{\frac{G_4}{G_{3.3}}(T_4-T_5)-\frac{G_3}{G_{3.3}}(T_{3.1}-T_3)}{T_4-T_{3.3}} \qquad \text{Equation (V)}$$

where G is the product of mass flow rate and specific heat. The mass flow rate at 3.3 and 4 is the same; mass flow rate at 3 is 80% of that at 3.3 (due to 20% steam injection). $C_p$ ratios are calculated from the assumed values of specific heat ratio. The calculation yields an efficiency of 70.7%.

The cycle efficiency is sensitive to the recuperator effectiveness. For instance, repeating the calculation as above but with effectiveness decreased to 80% results in a cycle efficiency close to 60%. Note that this is still a remarkably high value, nearly 15% higher than the cycle without the water cycle addition, which in turn is about 10% higher in efficiency than the state of the art.

The present disclosure may also be described in accordance with the following numbered Clauses, which should not be confused with the claims.

Clause 1. A combined heat and power (CHP) system, comprising: a turbine system comprising a high pressure compressor, a high pressure turbine, a combustor, and a recuperator, wherein the turbine system provides a combustion product stream; a turbocharger system comprising a low pressure compressor and a low pressure turbine, wherein the turbocharger system receives at least a portion of the combustion product stream from the turbine system and provides a compressed air stream; and a refrigeration system comprising a hot gas heat exchanger and a cold gas heat exchanger in fluid communication therewith, wherein the refrigeration system receives at least a portion of the combustion product stream from the turbine system and at least a portion of the compressed air stream from the turbocharger system; wherein the refrigeration system combines and cools the combustion product stream and the compressed air stream to generate a cooled combustion product mixture that is provided to the turbine system; and wherein the refrigeration system further generates steam that is provided to the turbine system.

Clause 2. The CHP system of clause 1, wherein the cooled combustion product mixture is provided to the high pressure compressor of the turbine system.

Clause 3. The CHP system of clause 1 or 2, wherein the steam from the refrigeration system is provided to the recuperator of the turbine system.

Clause 4. The CHP system of any one of clauses 1-3, wherein the combustion product stream from the turbine system is received at the hot gas heat exchanger of the refrigeration system.

Clause 5. The CHP system of any one of clauses 1-4, wherein the cooled combustion product mixture is an output from the cold gas heat exchanger of the refrigeration system.

Clause 6. The CHP system of any one of clauses 1-5, further comprising a warm gas heat exchanger that is associated with the refrigeration system, wherein the warm gas heat exchanger receives a mixture of the combustion product stream from the turbine system and the compressed air stream from the turbocharger system, and cools the mixture to provide the cooled combustion product mixture.

Clause 7. The CHP system of any one of clauses 1-6, further comprising a pump and a warm gas heat exchanger that are associated with the refrigeration system, wherein the pump provides cold water to the warm gas heat exchanger, and the warm gas heat exchanger heats the cold water to provide a heated water stream.

Clause 8. The CHP system of any one of clauses 1-7, further comprising a fuel cell intermediate and in fluid communication with the recuperator and the compressor of the turbine system.

Clause 9. The CHP system of any one of clause 1-8, wherein the CHP system generates electrical energy and thermal energy, and wherein at least a portion of the thermal energy generated by the CHP system is wasted or not utilized.

Clause 10. A combined heat and power (CHP) system, comprising: a turbine system; a turbocharger system; and a refrigeration system; wherein the turbine system generates a combustion product, and the turbocharger system generates a compressed air stream; wherein the refrigeration system receives at least a portion of the combustion product and the compressed air stream, and combines and cools the combustion products and the compressed air to generate a cooled combustion product mixture that is provided to the turbine system; and wherein the refrigeration system further provides water in at least one of liquid or gaseous form to the turbine system.

Clause 11. The CHP system of clause 10, wherein the cooled combustion product mixture is provided to a high pressure compressor of the turbine system.

Clause 12. The CHP system of clause 10 or 11, wherein the water is provided to a recuperator of the turbine system.

Clause 13. The CHP system of any one of clauses 10-12, wherein the combustion product from the turbine system is received at a hot gas heat exchanger of the refrigeration system.

Clause 14. The CHP system of any one of clauses 10-13, wherein the cooled combustion product mixture is an output from a cold gas heat exchanger of the refrigeration system.

Clause 15. The CHP system of any one of clauses 10-14, further comprising a warm gas heat exchanger that is associated with the refrigeration system, wherein the warm gas heat exchanger cools a mixture of the combustion product from the turbine system and the compressed air.

Clause 16. The CHP system of any one of clause 15, further comprising a pump that is associated with the refrigeration system, wherein the pump provides cold water to the warm gas heat exchanger, which heats the cold water to provide a heated water stream.

Clause 17. The CHP system of any one of clauses 1-16, further comprising a fuel cell that is intermediate and in fluid communication with the recuperator and combustor.

Clause 18. The CHP system of any one of clauses 10-17, wherein the CHP system generates electrical energy and thermal energy, and wherein at least a portion of the thermal energy generated by the CHP system is wasted or not utilized.

Clause 19. A method, comprising: generating water using a refrigeration system of a combined heat and power (CHP) system; heating the water using the refrigeration system to generate steam; and providing the steam to a recuperator of a turbine system for the CHP system.

Clause 20. The method of clause 19, further comprising: using a turbocharger system of the CHP system to generate compressed air; providing a mixture of combustion products from the turbine system and compressed air from the turbocharger system to the refrigeration system; cooling the mixture of combustion products and compressed air using the refrigeration system to generate a cooled combustion product mixture; and providing the cooled combustion product mixture to a high pressure compressor of the turbine system.

Clause 21. The method of clause 19 or 20, wherein the method further comprises: using a cold gas heat exchanger of the refrigeration system to generate the water; providing the water to a warm gas heat exchanger that is associated with the refrigeration system and using the warm gas heat exchanger to heat the water; providing the heated water to a gas heat exchanger that is associated with the refrigeration system and using the hot gas heat exchanger to generate the steam.

Clause 22. The method of any one of clauses 19-21, wherein providing the water to the warm gas heat exchanger comprises pumping the water from the cold gas heat exchanger to the warm gas heat exchanger.

Clause 23. The method of clause 20, further comprising: using the compressor of the turbine system to generate a compressed combustion product mixture; combining the steam and compressed combustion product mixture to generating a humid combustion product mixture; and providing the humid combustion product mixture to a combustor of the turbine system.

Clause 24. The method of any one of clauses 19-23, wherein the refrigeration system comprises a vapor absorption system.

Clause 25. The method of any one of clauses 19-24, further comprising using the compressor of the turbine system to generate a compressed combustion product mixture; combining the steam and compressed combustion product mixture to generating a humid combustion product mixture; and providing the compressed humid combustion product mixture to a fuel cell system that is associated with the turbine system, and using the fuel cell system to generate additional power.

The above-described embodiments are merely examples of implementations to set forth a clear understanding of the principles of the disclosure. Many variations and modifications may be made to the above-described embodiments without departing substantially from the spirit and principles of the disclosure. All such modifications and variations are intended to be included herein within the scope of this disclosure.

Therefore, the following is claimed:

1. A combined heat and power (CHP) system, comprising:
   a turbine system comprising a high pressure compressor, a high pressure turbine, a combustor, and a recuperator, wherein the turbine system provides a combustion product stream;
   a fuel cell intermediate and in fluid communication with the recuperator and the combustor of the turbine system;
   a turbocharger system comprising a low pressure compressor and a low pressure turbine, wherein the turbocharger system receives at least a portion of the combustion product stream from the turbine system and provides a compressed air stream; and
   a refrigeration system comprising a hot gas heat exchanger and a cold gas heat exchanger in fluid communication therewith, wherein the refrigeration system receives at least a portion of the combustion product stream from the turbine system and at least a portion of the compressed air stream from the turbocharger system;
   wherein the refrigeration system combines and cools the combustion product stream and the compressed air stream to generate a cooled combustion product mixture that is provided to the turbine system; and
   wherein the refrigeration system further generates steam that is provided to the turbine system.

2. The CHP system of claim 1, wherein the cooled combustion product mixture is provided to the high pressure compressor of the turbine system.

3. The CHP system of claim 1, wherein the steam from the refrigeration system is provided to the recuperator of the turbine system.

4. The CHP system of claim 1, wherein the combustion product stream from the turbine system is received at the hot gas heat exchanger of the refrigeration system.

5. The CHP system of claim 1, further comprising a warm gas heat exchanger that is associated with the refrigeration system, wherein the warm gas heat exchanger receives a mixture of the combustion product stream from the turbine system and the compressed air stream from the turbocharger system, and cools the mixture to provide the cooled combustion product mixture.

6. The CHP system of claim 1, wherein the CHP system generates electrical energy and thermal energy, and wherein at least a portion of the thermal energy generated by the CHP system is wasted or not utilized.

7. The CHP system of claim 1, wherein the fuel cell wherein the fuel cell receives a compressed combustion gas mixture from the recuperator and a fuel.

8. The CHP system of claim 1, wherein the fuel cell generates a stream comprising hot depleted oxidizer and fuel, that is provided to the combustor of the turbine system.

9. A combined heat and power (CHP) system, comprising:
   a turbine system;
   a turbocharger system; and
   a refrigeration system;
   wherein the turbine system generates a combustion product, and the turbocharger system generates a compressed air stream;
   wherein the refrigeration system receives at least a portion of the combustion product and the compressed air stream, and combines and cools the combustion products and the compressed air to generate a cooled combustion product mixture that is provided to the turbine system; and
   wherein a fuel cell is in fluid communication with the turbine system, wherein the fuel cell receives a compressed combustion qas mixture from the turbine system and a fuel and generates electrical power.

10. The CHP system of claim 9, wherein the cooled combustion product mixture is provided to a high pressure compressor of the turbine system.

11. The CHP system of claim 9, wherein the refrigeration system further provides water in at least one of liquid or gaseous form to a recuperator of the turbine system.

12. The CHP system of claim 9, wherein the combustion product from the turbine system is received at a hot gas heat exchanger of the refrigeration system.

13. The CHP system of claim 9, further comprising a warm gas heat exchanger that is associated with the refrigeration system, wherein the warm gas heat exchanger cools a mixture of the combustion product from the turbine system and the compressed air.

14. The CHP system of claim 9, wherein the CHP system generates electrical energy and thermal energy, and wherein at least a portion of the thermal energy generated by the CHP system is wasted or not utilized.

15. The CHP system of claim 9, wherein the fuel cell generates a stream comprising hot depleted oxidizer and fuel, that is provided to the combustor of the turbine system.

16. A method, comprising:
using a turbocharger system of a combined heat and power (CHP) system to generate compressed air;
combining a combustion product from a turbine system with compressed air from the turbocharger system to provide a mixture of combustion products and compressed air;
cooling the mixture of combustion products and compressed air using a refrigeration system to generate a cooled combustion product mixture;
compressing the cooled combustion product mixture in a high pressure compressor of the turbine system, resulting in a compressed combustion product mixture;
heating the compressed combustion product mixture in a recuperator of the turbine system;
introducing the heated and compressed combustion product stream to a fuel cell system that is associated with the turbine system; and
generating electrical power using the fuel cell system.

17. The method of claim 16, further comprising:
generating water using a refrigeration system of the combined heat and power (CHP) system;
heating the water using the refrigeration system to generate steam; and
providing the steam to a recuperator of a turbine system for the CHP system.

18. The method of claim 17, wherein the method further comprises:
using a cold gas heat exchanger of the refrigeration system to generate the water;
providing the water to a warm gas heat exchanger that is associated with the refrigeration system and using the warm gas heat exchanger to heat the water;
providing the heated water to a gas heat exchanger that is associated with the refrigeration system and using the hot gas heat exchanger to generate the steam.

19. The method of claim 17, wherein the refrigeration system comprises a vapor absorption system.

* * * * *